(12) United States Patent
Xie et al.

(10) Patent No.: US 11,330,434 B2
(45) Date of Patent: *May 10, 2022

(54) SECURITY DETECTION FOR A PHYSICAL LAYER AUTHENTICATION SYSTEM THAT CONSIDERS SIGNAL-DISCRIMINATING CAPABILITY OF AN ACTIVE ADVERSARY

(71) Applicant: Shenzhen University, Shenzhen (CN)

(72) Inventors: Ning Xie, Shenzhen (CN); Zhuoyuan Li, Shenzhen (CN)

(73) Assignee: Shenzhen University, Shenzhen (CN)

( * ) Notice: Subject to any disclaimer, the term of this patent is extended or adjusted under 35 U.S.C. 154(b) by 326 days.

This patent is subject to a terminal disclaimer.

(21) Appl. No.: 16/672,349

(22) Filed: Nov. 1, 2019

(65) Prior Publication Data
US 2020/0169882 A1    May 28, 2020

(30) Foreign Application Priority Data
Nov. 22, 2018  (CN) .......................... 201811401622.X (51) Int. Cl.
*H04W 12/06*  (2021.01)
*G06F 17/18*  (2006.01)

(52) U.S. Cl.
CPC ............. *H04W 12/06* (2013.01); *G06F 17/18* (2013.01)

(58) Field of Classification Search
CPC ..... H04W 12/06; H04W 12/122; G06F 17/18; H04L 9/0875; H04L 9/3226; H04L 2209/26
See application file for complete search history.

(56) References Cited

U.S. PATENT DOCUMENTS

| | | | |
|---|---|---|---|
| 10,735,963 B1* | 8/2020 | Sadler | H04L 63/061 |
| 2010/0246825 A1* | 9/2010 | Baras | H04L 9/0894 380/270 |
| 2013/0163761 A1* | 6/2013 | Baras | H04L 9/0875 380/270 |
| 2020/0169883 A1* | 5/2020 | Xie | H04W 12/06 |

* cited by examiner

*Primary Examiner* — Baotran N To
(74) *Attorney, Agent, or Firm* — Jeffrey Pearce

(57) ABSTRACT

A method of security detection for a physical layer authentication system takes into account the signal-discriminating ability of an active adversary. The distance to the active adversary is estimated by an authorized transmitter based on its broadcast signal and, based on the distance estimate, the signal-to-noise ratio (SNR) of the adversary is also estimated.

10 Claims, 3 Drawing Sheets

SECURITY DETECTION FOR A PHYSICAL LAYER AUTHENTICATION SYSTEM THAT CONSIDERS SIGNAL-DISCRIMINATING CAPABILITY OF AN ACTIVE ADVERSARY

CROSS-REFERENCE TO RELATED APPLICATIONS

This application claims priority of Chinese patent application No. 201811401622.X filed Nov. 22, 2018, for "Security Detection Method for the Physical Layer Authentication System Considering Adversary Computing Capability".

TECHNICAL FIELD

The present disclosure relates to wireless communication technology, in particular, to a security detection method for a physical layer authentication.

BACKGROUND ART

The ability to verify the authenticity of a transmitter is a fundamental security requirement, and authentication technology is typically based on an encryption mechanism and identity authentication carried out in an upper layer. Compared with this authentication technology, authentication at a physical layer has two main advantages. First, the authentication at the physical layer may achieve higher information theory security by introducing uncertainty (such as noise) into the monitoring device of an active adversary. Second, authentication at the physical layer may avoid the need for operation of an upper layer, so higher efficiency and better compatibility may be achieved.

Performance evaluation of physical layer authentication technology is mainly based on three characteristics: covertness, security, and robustness. Specifically, covertness may have two aspects: methods for authentication should not be easily detected or observed; and there should be no significant effect on the ability of an unaware receiver to recover the message. Security is the ability to resist attacks by an actively adversarial monitoring device. Robustness is the ability to evaluate whether the authentication technology may be used in interference.

However, research analyzing the performance analysis of physical layer authentication is still imperfect. Because the above three characteristics are usually analyzed separately, it is difficult to systematically analyze the effect of parameters of a certain physical layer authentication scheme on final performance, and it is also difficult to fairly compare the performance of different physical layer authentication schemes under the same channel conditions.

DETAILED DESCRIPTION

The technical solutions in the embodiments of the present disclosure will be clearly and completely described in the following with reference to the accompanying drawings. It is apparent that the described embodiments are only some of the embodiments of the disclosure, and not all possible embodiments. All other embodiments obtained by those skilled in the art based on the embodiments of the present disclosure without creative efforts are within the scope of the present disclosure.

It should be noted that the terms "first", "second", and the like in the specification and claims of the present disclosure and the above drawings are used to distinguish different objects, and are not intended to describe a specific order. Furthermore, the terms "comprises" and "comprising" are intended to cover a non-exclusive inclusion. For example, a process, method, system, product, or device that "comprises" a series of steps or units is not limited to the listed steps or units, but optionally also includes steps or units not listed, or other steps or units optionally inherent to these processes, methods, products or equipment.

The disclosure discloses a security detection method for a physical layer authentication system that takes into account the signal-discriminating capability of an active adversary. This may improve the convenience and accuracy of authentication system performance analysis. Here, as is common in the literature, that an adversary is "active" implies that it transmits one or more signals intended to negatively affect one or more authorized systems. The purpose of such signals might, for example, be jamming or spoofing. In broad terms, one feature of embodiments is estimation by an authorized transmitter of the distance to an active adversary based on its broadcast signal and, based on the distance estimate, an estimation of the signal-to-noise ratio (SNR) of the adversary. The details are described below.

Figure 1:
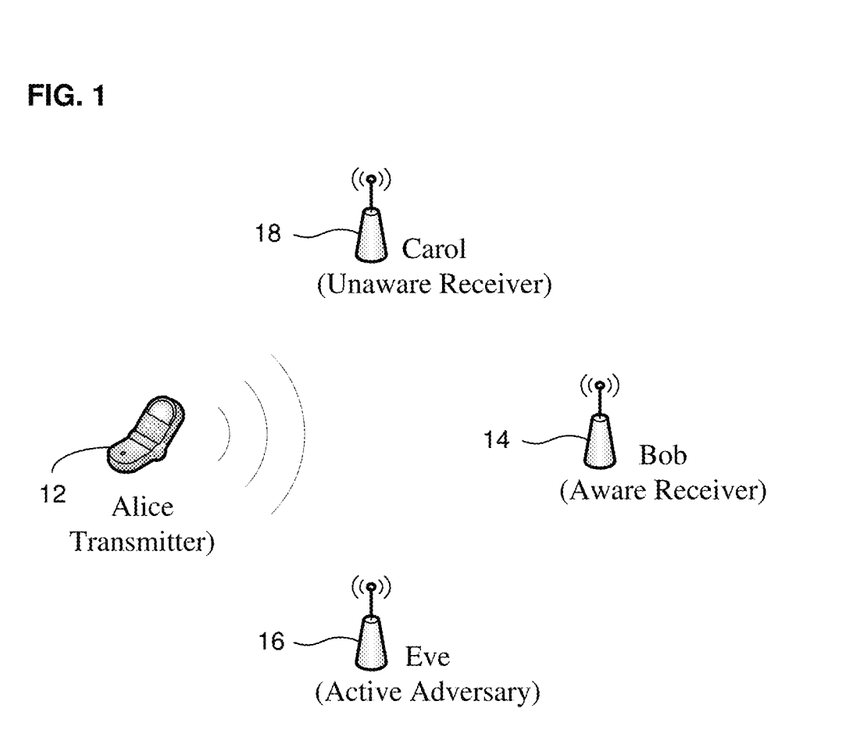
FIG. 1 is a schematic scenario diagram of a security detection method for a physical layer authentication system according to some embodiments.

FIG. 1 is a schematic scenario diagram that illustrates some embodiments of a security detection method for a physical layer authentication system that takes into account the signal-discriminating capability of an active adversary. As shown in FIG. 1, the security detection method for this physical layer authentication may be that of a wireless communication physical authentication system including an authorized transmitting device 12 (shown also as "Alice"), a receiving device 14 ("Bob"), and an active, adversarial monitoring device 16 (the "adversary", for short, or "Eve").

According to some embodiments, as shown in FIG. 1, the security detection method for the physical layer authentication system is based on a general signal transmission scenario 10. The signal transmission scenario includes four users: the transmitting device 12, the receiving device 14, the adversary 16, and an unaware monitoring device 18 ("Carol"). Although only one each is shown in FIG. 1 and described here, the number of transmitting devices, receiving devices, adversaries, and unaware monitoring devices could instead be two or more. The transmitting device 12 may transmit a carrier signal to the receiving device 14, and the adversary and the unaware monitoring device may also receive the carrier signal.

According to some embodiments, it is assumed that the transmitting device 12 and the receiving device 14 agree on an authentication scheme with a shared secret key that allows the receiving device 14 to verify a tagged message transmitted from the transmitting device 12. Here, as in the prior art, a "tagged" message is one in which a tag is embedded, for example, and may be in the known form of a hash of a secret key and the source message. The unaware monitoring device 18 does not know the authentication scheme between the transmitting device and the receiving device, so the unaware monitoring device cannot authenticate the tagged signal in the carrier signal; however, the unaware monitoring device could still recover a message signal not secured by the secret key in the carrier signal itself. The adversary may be aware of the authentication scheme between the transmitting device and the receiving device, but it cannot generate the tag, that is, the adversary cannot authenticate that signal.

According to some embodiments, the transmitting device, receiving device, unaware monitoring device, or adversary of the signal transmission scenario shown in FIG. 1 may include a base station or other user equipment. The receiving device may also include user equipment or test equipment. A base station (e.g., an access point or node) may refer to a device in an access network that communicates with a wireless terminal by one or more sectors over an air interface. The base station may convert received air frames to IP packets as a router between the wireless terminal and the rest of the access network, which may include an Internet Protocol (IP) network. The base station may also coordinate attribute management of the air interface. For example, the base station may be a GSM or CDMA base station (BTS, Base Transceiver Station) in, or may be, a WCDMA base station (NodeB), or may be a LTE evolutionary base station (NodeB, eNB, e-NodeB, evolutional NodeB).

According to some embodiments, the user equipment or test equipment may include, but is not limited to, various types of electronic devices, such as a smart phone, a notebook computer, a personal computer (PC), a personal digital assistant (PDA), a mobile internet device (MID), a wearable device (such as a Smart watch, a smart bracelet, and a smart glasses). An operating system of the user device may include, but is not limited to, an Android operating system, an IOS operating system, a Symbian operating system, a BlackBerry operating system and Windows Phone 8 operating system and so on; these are not limitations in the embodiment of the present disclosure.

Figure 2:
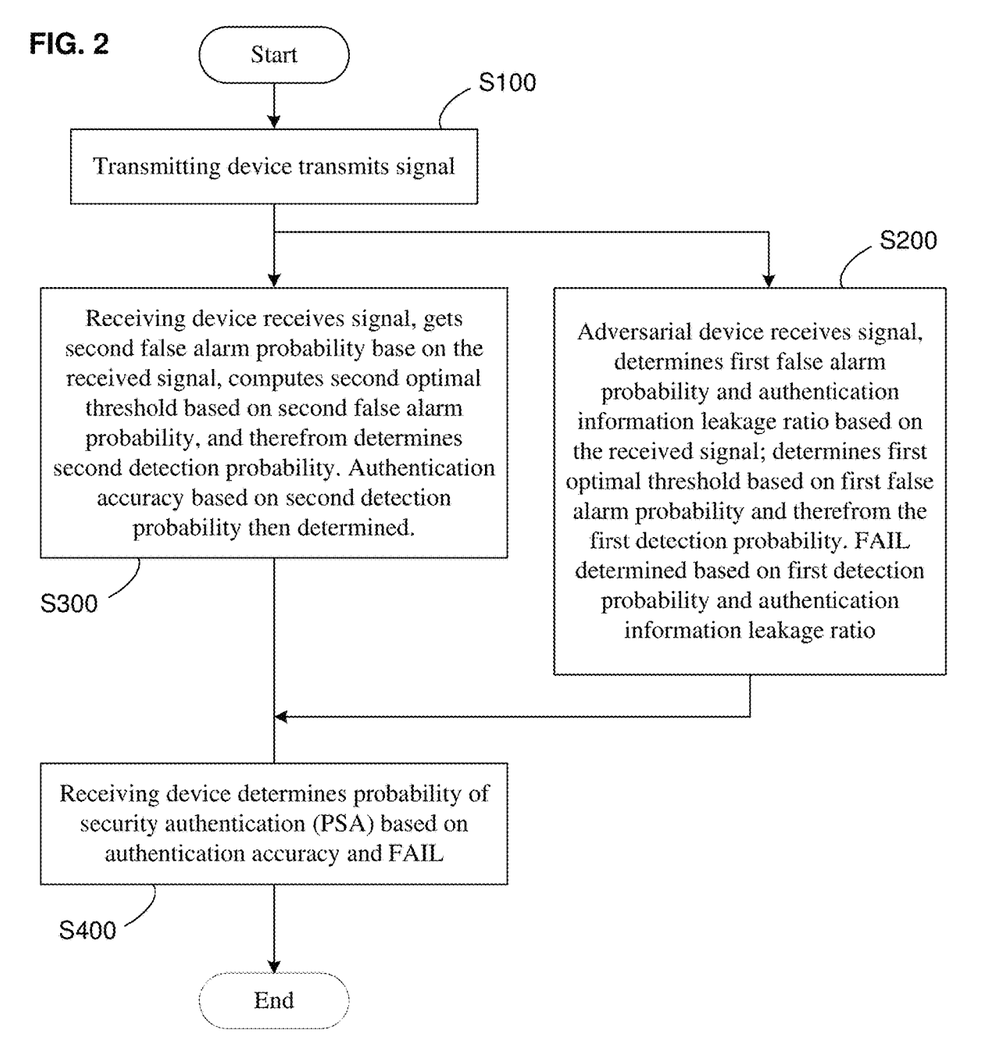
FIG. 2 is a schematic flowchart diagram of a security detection method for a physical layer authentication system according to some embodiments.

FIG. 2 is a schematic flowchart diagram of the security detection method for the physical layer authentication system that considers adversary computing capability according to some embodiments.

According to some embodiments, based on the signal transmission scenario shown in FIG. 1, the security detection method for the present physical layer authentication system as shown in FIG. 2, could include: The transmitting device transmits a signal (step S100), to be specific, the transmitting device may transmit a first signal through a wireless fading channel, and then the receiving device, the unaware monitoring device, and the adversary may obtain a second signal respectively. The wireless fading channel may include a flat block-fading channel.

In step S100, the first signal may be transmitted in the form of data blocks, which makes it easy to manipulate data. A first signal $x_i$ of an i'th block, that is, the first signal $x_i$ of each block, is an independent and identically distributed (i.i.d) random variable (RVs). The signal length of the first signal $x_i$ of the i'th block is L.

According to some embodiments, the first signal may be a normal signal. A normal signal may be a message signal obtained by encoding and modulating an initial signal, which may be represented as $x_i=s_i$, where $s_i$ denotes the i'th block of the message signal. The first signal may also be a tagged signal. A tagged signal may include a message signal and a tag signal which may be expressed as $x_i=\rho_s^* s_i + \rho_t^* t_i$, wherein $\rho_t^2$ and $\rho_s^2$ may be interpreted as energy allocations of the message and tag, respectively, and $\rho_s^2 + \rho_t^2 = 1$. When $\rho_t^2 = 0$, the first signal does not contain any authentication tag and $x_i = s_i$, which is defined as a normal signal. Furthermore, $t_i$ denotes the i'th block tag signal, which may be generated by a hash function $g(\cdot)$ with a secret key K shared between the transmitting device and the receiving device, which is expressed as $t_i = g(s_i, K)$.

According to some embodiments, the transmitting device may control the message signal energy allocations $\rho_t^2$ and $\rho_s^2$. To be specific, the transmitting device may use automatic power control to achieve power control. For instance, if ratio frequency signals received by the transceiver station of the base station are successively input into a filter and a frequency converter with filtering function, then we may obtain an IF (intermediate frequency) signal. After that, the IF signal may be input into an automatic power control module of the base station to adjust power. The automatic power control module may include an ADC (analog-to-digital converter), a DC-removal unit, a power estimation unit, and a power feedback adjustment unit.

In step S100, the first signal is passed through the wireless fading channel, and the receiving device, the unaware monitoring device, and the adversary may obtain the second signal. Different data blocks of the first signal may fade independently when passing through the wireless fading channel. An i'th block of the second signal may be express as $$y_i = h_i^* x_i + n_i \tag{1}$$

where $h_i$ is a channel response, which is a zero-mean complex Gaussian RV with variance $\sigma_h^2$, and $n_i$ is a zero-mean complex Gaussian white noise with variance $\sigma_n^2$.

According to some embodiments, as shown in FIG. 2, the security detection method for the physical layer authentication system may consider the computing capability of the adversary, in step S200. This may include computing a first false alarm probability based on a received second signal, computing a first optimal threshold from the first false alarm probability, and determining a first detection probability and obtaining a feasible authentication information leakage (FAIL) value based on the authentication information leakage ratio and the first detection probability. In the step S200, to be specific, the adversary may receive the second signal, compute a first testing statistic and an estimated tag based on the second signal, compute a key equivocation value based on the estimated tag signal, compute an authentication information leakage ratio based on the key equivocation, compute a first false alarm probability based on a first testing hypothesis and the first testing statistic, based on the Neyman-Pearson theorem, determine the first optimal threshold if the first false alarm probability is less than or equal to an upper bound of the first false alarm probability, determine the first detection probability, and then determining the FAIL value based on the first detection probability and the authentication information leakage ratio.

In step S200, the adversary may be assumed to receive the second signal. The SNR (signal-to-noise ratio) $\gamma_i$ of the i'th block of the second signal $y_i$ may be denoted as $\gamma_i = |h_i|^2/\sigma_h^2$. The adversary may be assumed to estimate an i'th block of an object signal using its channel estimation $\hat{h}_i$. The object signal may be denoted as $$\hat{x}_i = \frac{\hat{h}_i^*}{|\hat{h}_i|^2} y_i \qquad (2)$$

where ( )* represents the conjugate-taking operation. Here, to simplify the analysis, assume that the adversary has a perfect channel estimation, i.e., $\hat{h}_i = h_i$. Then, by sequential demodulation and decoding, the adversary could determine the source message signal for the object, that is, the message signal.

According to some embodiments, based on the second signal, the adversary determines the key equivocation $\mathbb{H}$ $(k|y_i)$ value after obtaining the estimated tag $\hat{t}$. For an ideal, noiseless environment, the key equivocation value may be expressed as:

$$H(k|s_i, t_i) = \sum_{s \in S, t \in T} Pr(s_i, t_i) H(k|s, t) \qquad (3)$$

where $\mathbb{H}(\cdot)$ represents a binary entropy operator, and H $(k|s,t)$ may be calculated as $$H(k|s, t) = -\sum_{k \in K} Pr(k|s, t) \log Pr(k|s, t) \qquad (4)$$

where $Pr(k|s,t) \triangleq Pr(k=k|s_i=s, t_i=t)$. Let S, T, and K be the domains of the message signal $s_i$ of the i'th block, tag signal $t_i$ of the i'th block, and key k, respectively.

To be specific, the adversary could calculate a Hamming distance h $(\hat{t}, t_i)$ from each tag signal $t_i$. An independent identically distributed (i.i.d.) tag bit-error probability may be calculated as $p_e = Q(\sqrt{g_i})$, where $Q(\cdot)$ is a tail probability function of a standard normal distribution. Based on the estimated tag signal, an estimating probability of the tag signal should satisfy the formula $$Pr(t_i|\hat{t}) = p_e^{h(\hat{t},t_i)} (1-p_e)^{\log_2|T|-h(\hat{t},t_i)} \qquad (5)$$

where T represents each tag signal $t_i$. When $|T|$ is greater than $|K|$, $\{t_i\} \subset T$, $Pr(t|\hat{t})$ does not belong to a probability distribution because $\Sigma_{t_i \in T} Pr(t_i|\hat{t}) < 1$. Thus, the estimating probability should be scaled by the formula $$f(t_i|\hat{t}) = \frac{Pr(t_i|\hat{t})}{\sum_{t_i \in T} Pr(t_i|\hat{t})} \qquad (6)$$

The key equivocation may be expressed as $$\begin{aligned} H(k|y_i) &\cong H(k|s_i, \hat{t}_i) \\ &= -\sum_{k_i \in K} f(k_i|\hat{t}) \log_2 f(k_i|\hat{t}) \\ &= -\sum_{k \in K} f(t_i|\hat{t}) \log_2 f(t_i|\hat{t}) \end{aligned} \qquad (7)$$

where k denotes the key, $k_i$ denotes the key of the i'th block, $y_i$ denotes the second signal of the i'th block, $s_i$ denotes the message signal of the i'th block, $\hat{t}_i$ denotes the estimated tag signal of the i'th block, and $t_i$ denotes the tag signal of the i'th block. The key equivocation value may thereby be determined.

In step S200, the authentication information leakage ratio may be determined based on the key equivocation value, which may be expressed as $$I_{Eve} = \left(1 - \frac{H(k|y_i)}{\log_2|T|}\right) \qquad (8)$$

where T denotes the tag signal $t_i$ of the i'th block. $H(k|y_i)/\log_2|T|$ denotes the normalized key equivocation value. The value of the authentication information leakage ratio $I_{Eve}$ should fall into the range [0, 1]. When $H(k|y_i)=0$, the authentication information leakage ratio is $I_{Eve}=1$, which indicates that the key equivocation value is equal to zero and the tag signal is totally exposed to the adversary. When H $(k|y_i)=\log_2|T|$, the authentication information leakage ratio $I_{Eve}=0$, which indicates that the adversary does not gain the key and tag signal.

According to some embodiments, the adversary could obtain the first testing statistic based on the second signal. To be specific, the adversary could construct the first testing statistic $\delta_{i, Eve}$ by match-filtering the residual. The first testing statistic may be calculated as $$\delta_{i,Eve} = R\{\tau_{i,Eve}\} = R\{s_i^H s_i - \hat{x}_i^H s_i\} = R\{(s_i^H - \hat{x}_i^H) s_i\},$$

where R $\{\cdot\}$ represents the operation of extracting the real part, $\tau_{i, Eve}$ denotes the first initial testing statistic and $\hat{x}_i$, is defined in (2). There are two reasons for calculating the testing statistic $\delta_{i, Eve}$. First, the correlation between $\hat{x}_i$, and $s_i$ explicitly quantifies how much the space of the normal signal is occupied by the authentication tag for a physical layer authentication scheme, i.e., the lower the correlation value is, the more the normal signal space is occupied. Second, the testing statistic using the correlation operation could provide tractable closed-form results for existing physical layer authentication schemes. In other embodiments, using the testing statistic could obtain a new physical layer authentication system scheme.

According to some embodiments, based on the first testing hypothesis, the adversary could determine whether the second signal contains the authenticated signal. The first testing hypothesis could be expressed as:

$H_{10}$: the second carrier signal is a normal signal $H_{11}$: the second carrier signal is a tagged signal In addition, the first optimal threshold $\theta_{i, Eve}$ of the i'th block may be determined based on the first testing hypothesis.

According to some embodiments, the first testing statistic $\tau_{i, Eve}$ for the different hypotheses may be respectively expressed by two formulas:

$$\tau_{i,Eve}|H_{10} = s_i^H s_i - s_i^H s_i - v_{i,Eve} = -v_{i,Eve}, \text{ and}$$

$$\tau_{i,Eve}|H_{11} = (1-\rho_s) s_i^H s_i - \rho_s t_i^H s_i - v_{i,Eve}$$

where $v_{i, Eve} = (h^*_{Eve}/|h_{i, Eve}|^2) s_i^H n_{i, Eve}$ is a random variate with zero-mean Gaussian RV, variance $\sigma_{v_{i, Eve}}^2 = L\sigma_{n, Eve}^2/|h_{i, Eve}|^2 = L/\gamma_{i, Eve}$, and $\gamma_{i, Eve} = |h_{i, Eve}|^2/\sigma_{n, Eve}^2$. Where $h_{i, Eve}$ represents the i'th block channel response of the adversary, $\gamma_{i, Eve}$ represents the i'th block SNR of the adversary by estimating a position of the adversary, and $\sigma_{n,Eve}^2$ represents the variance of noise at the adversary. Because $E\{\tau_{i,Eve}|H_{10}\}=0$ and $\text{var}\{\tau_{i,Eve}|H_{10}\}=L/\gamma_{i,Eve}$, the first testing statistic under a condition $H_{10}$ should follow a distribution, i.e., $t_{i,Eve}|H_{10}\sim CN(0, L/g_{i,Eve})$. Simultaneously, because $E\{\tau_{i,Eve}|H_{11}\}=(1-\rho_s)L$ and $\text{var}\{\tau_{i,Eve}|H_{11}\}=L/\gamma_{i,Eve}$, the first testing statistic under a condition $H_{11}$ should follow a distribution, i.e., $t_{i,Eve}|H_{11}\sim CN((1-r_s)L, L/g_{i,Eve})$. Then, because $\delta_{i,Eve}=R\{\tau_{i,Eve}\}$, the first testing hypothesis may be transformed into $$H_{10}: \delta_{i,Eve} \sim N\left(0, \frac{L}{2\gamma_{i,Eve}}\right) \quad (9)$$

$$H_{11}: \delta_{i,Eve} \sim N\left((1-\rho_s)L, \frac{L}{2\gamma_{i,Eve}}\right)$$

According to some embodiments, the adversary could obtain a first false alarm probability based on the first testing hypothesis (9) and the first testing statistic. To be specific, the adversary could obtain the i'th block of first test threshold $\theta_{i,Eve}$ based on the first testing hypothesis. Based on the i'th block of first test threshold $\theta_{i,Eve}$, the first testing statistic and the first testing hypothesis (9), the first false alarm probability $P_{FA,i,Eve}$ of the i'th block may be obtained, which may be expressed as $$P_{FA,i,Eve} = Pr\{\delta_{i,Eve} > \theta_{i,Eve} | H_{10}\} \quad (10)$$

$$= Q\left(\frac{\theta_{i,Eve}}{\sqrt{\text{var}\{\delta_{i,Eve}|H_{10}\}}}\right)$$

$$= Q\left(\theta_{i,Eve}\sqrt{\frac{2\gamma_{i,Eve}}{L}}\right)$$

where $\gamma_{i,Eve}$ represents the i'th block SNR of the adversary by estimating the position of the adversary, and $\delta_{i,Eve}$ represents the first testing statistic of the i'th block. The first false alarm probability may thereby be determined.

According to some embodiments, $h_{i,Eve}$ may follow a zero-mean complex Gaussian RV, and $|h_i|^2$ is an exponential RV. Based on $$\frac{1}{b}\int_0^\infty Q(\sqrt{x})\exp\left(\frac{-x}{b}\right)dx = \frac{1}{2}\left(1 - \sqrt{\frac{b}{2+b}}\right),$$

the first false alarm probability may be obtained by computing the mean of all data blocks, which may be calculated by $$P_{FA,Eve} = E\left\{Q\left(\sqrt{\frac{2(\theta_{Eve}^0)^2|h_{i,Eve}|^2}{L\sigma_{n,Eve}^2}}\right)\right\} \quad (11)$$

$$= \frac{1}{\sigma_{h,Eve}^2}\int_0^\infty Q\left(\sqrt{\frac{2(\theta_{Eve}^0)^2 y}{L\sigma_{n,Eve}^2}}\right)\exp\left(\frac{-y}{\sigma_{h,Eve}^2}\right)dy$$

$$= \frac{1}{2}\left(1 - \sqrt{\frac{(\theta_{Eve}^0)^2\gamma_{Eve}}{L+(\theta_{Eve}^0)^2\gamma_{Eve}}}\right)$$

where $\gamma_{Eve}=E(\gamma_{i,Eve})$ represents the SNR of the adversary by estimating the position of suspicious nodes, i.e., the adversary.

In step S200, based on the Neyman-Pearson theorem, the adversary could determine the first optimal threshold when the first false probability is less than or equal to the upper bound of the first false probability. Finally, based on the first detection probability and the authentication information leakage ratio, one may determine the FAIL value.

According to some embodiments, based on Neyman-Pearson theorem, the first false probability $P_{FA,Eve}$ is satisfied if $P_{FA,Eve} \leq \varepsilon_{PFA,Eve}$, where $\varepsilon_{PFA,Eve}$ denotes the upper bound of the first false probability. Thus, it is possible to ensure that the system can find an optimal authentication threshold by setting the first false probability less than or equal to an upper bound. Based on the optimal authentication threshold, this also enable the computation of the maximum of the first detection probability.

According to some embodiments, when $P_{FA,Eve} \leq \varepsilon_{PFA,Eve}$, the first false probability is set equal to the upper bound of the first false probability $\varepsilon_{PFA,Eve}$; after that, the first optimal threshold $\theta_{Eve}^0$ may be computed as $$\theta_{Eve}^0 = \sqrt{\frac{(1-2\varepsilon_{PFA,Eve})^2 L}{4(\varepsilon_{PFA,Eve} - \varepsilon_{PFA,Eve}^2)\gamma_{Eve}}}$$

where L denotes a signal length of each block of first signal. To be specific, $\gamma_{Eve}$ may be determined by estimating the position of suspicious nodes, i.e., the adversary. The first optimal threshold may thereby be determined.

According to some embodiments, the adversary could determine the first detection probability by using the first optimal threshold. To be specific, the first detection probability of the i'th block may be expressed as:

$$P_{D,i,Eve} = Pr\{\delta_{i,Eve} > \theta_{Eve}^0 | H_{11}\} \quad (12)$$

$$= Q\left(\frac{\theta_{Eve}^0 - (1-\rho_s)L}{\sqrt{\text{var}\{\delta_{i,Eve}|H_{11}\}}}\right)$$

$$= \begin{cases} Q\left(\sqrt{\frac{2(\theta_{Eve}^0 - (1-\rho_s)L)^2\gamma_{i,Eve}}{L}}\right), & \theta_{Eve}^0 \geq (1-\rho_s)L \\ 1 - Q\left(\sqrt{\frac{2(\theta_{Eve}^0 - (1-\rho_s)L)^2\gamma_{i,Eve}}{L}}\right), & \theta_{Eve}^0 < (1-\rho_s)L \end{cases}$$

whereby the first detection probability may be determined.

According to some embodiments, the first detection probability may be computed by taking an average of all data blocks, which may be computed as $$P_{D,Eve} = E\{Pr\{\delta_{i,Eve} > \theta_{Eve}^0 | H_1\}\} \quad (13)$$

$$= \begin{cases} \frac{1}{2}\left(1 - \sqrt{\frac{(\theta_{Eve}^0 - (1-\rho_s)L)^2\gamma_{Eve}}{L + (\theta_{Eve}^0 - (1-\rho_s)L)^2\gamma_{Eve}}}\right), & \theta_{Eve}^0 \geq (1-\rho_s)L \\ \frac{1}{2}\left(1 + \sqrt{\frac{(\theta_{Eve}^0 - (1-\rho_s)L)^2\gamma_{Eve}}{L + (\theta_{Eve}^0 - (1-\rho_s)L)^2\gamma_{Eve}}}\right), & \theta_{Eve}^0 < (1-\rho_s)L \end{cases}$$

In summary:

$$P_{D,Eve} = \frac{1}{2}\left(1 - \text{sign}(\theta_{Eve}^0 - (1-\rho_s)L)\sqrt{\frac{(\theta_{Eve}^0 - (1-\rho_s)L)^2 \gamma_{Eve}}{L + (\theta_{Eve}^0 - (1-\rho_s)L)^2 \gamma_{Eve}}}\right) \quad (14)$$

According to some embodiments, the adversary could obtain the FAIL value $\eta_{Eve}$ based on the first detection probability and the authentication information leakage ratio which may be expressed as $\eta_{Eve} = P_{D, Eve} I_{Eve}$.

According to some embodiments, as shown in FIG. 2, the security detection method for the physical layer authentication system may consider the ability of the receiving device to receive a signal, step S300. It may include obtaining a second false alarm probability based on the received signal; obtaining a second optimal threshold based on the second false alarm probability; and computing a second detection probability. In the step S300, to be specific, the receiving device may receive a second signal, determine an object signal based on the second signal, determine a residual signal based on the object signal, and determine a second test statistic based on the residual signal. Based on the Neyman-Pearson theorem, the receiving device may determine the second optimal threshold if the second false alarm probability is less than or equal to an upper bound of the second false alarm probability, determine the second detection probability, and compute the authentication accuracy.

In step S300, the receiving device determines the object carrier signal based on the second signal (the signal received by the receiver). To be specific, the receiving device uses its channel estimation $\hat{h}_i$ to estimate the object signal of the i'th block according to formula (2).

According to some embodiments, the receiving device determines the residual signal based on the object signal. To be specific, the receiving device computes the residual signal of the i'th block $r_i$ based on the object signal of the i'th block. The residual signal of i'th block $r_i$ is constructed as:

$$r_i = \frac{1}{\rho_t}(\hat{x}_i - \rho_s \hat{s}_i) \quad (15)$$

According to some embodiments, the receiving device determines the second testing statistic $\delta_{i,Bob}$ by match-filtering the residual with the estimated tag and taking its real part, which is expressed as $\delta_{i, Bob} = R\{\tau_{i, Bob}\} = R\{t_i^H r_i\}$, where $\tau_{i, Bob}$ denotes the initial second testing statistic.

According to some embodiments, based on a second testing hypothesis, the receiving device may determine whether the second signal contains the authenticated signal, which may save computing resources. The second testing hypothesis may be expressed as $H_{20}$: the tag signal is not present in the residual signal $H_{21}$: the tag signal is present in the residual signal In addition, the second optimal threshold $\theta_{i, Bob}$ of the i'th block may be determined based on the second testing hypothesis, after which the second false alarm probability may be computed.

According to some embodiments, the second testing statistics $\tau_{i, Bob}$ for two different hypotheses may be respectively expressed by two formula:

$$\tau_{i,Bob} | H_{20} = \frac{1}{\rho_t}\left((1-\rho_s)\sum_{k=1}^{L} t_{i,k}^* s_{i,k} + \frac{h_i^*}{|h_i|^2}\sum_{k=1}^{L} t_{i,k}^* n_{i,k}\right), \text{ and}$$

$$\tau_{i,Bob} | H_{21} = \frac{1}{\rho_t}\left(\rho_t \sum_{k=1}^{L} t_{i,k}^* t_{i,k} + \frac{h_i^*}{|h_i|^2}\sum_{k=1}^{L} t_{i,k}^* n_{i,k}\right),$$

where $E\{\tau_{i, Bob}|H_{20}\}=0$, $\text{var}\{\tau_{i, Bob}|H_{20}\}=L/\rho_t^2 \gamma_{i, Bob}$, $\gamma_{i, Bob}=|h_{i, Bob}|^2/\sigma_{n, Bob}^2$ represents the SNR of the i'th block at the receiving device. The second testing statistic under the condition $H_{20}$ should follow a distribution, i.e., $t_{i, Bob}|H_{20} \sim CN(0, L/r_t^2 g_{i, Bob})$. Due to $E\{\tau_{i, Bob}|H_{21}\}=L$ and $\text{var}\{\tau_{i, Bob}|H_{21}\}=L/\rho_t^2 \gamma_{i, Bob}$, the second testing statistic under the condition $H_{20}$ should follow a distribution, i.e., $t_{i, Bob}|H_{21} \sim CN(L, L/r_t^2 g_{i, Bob})$. Then the second testing hypothesis may be transformed into $$H_{20}: \delta_{i,Bob} \sim N\left(0, \frac{L}{2\rho_t^2 \gamma_{i,Bob}}\right) \quad (16)$$

$$H_{21}: \delta_{i,Bob} \sim N\left(L, \frac{L}{2\rho_t^2 \gamma_{i,Bob}}\right)$$

According to some embodiments, the receiving device determines the second false alarm probability based on the second testing hypothesis, expressed by formula (16), and the second testing statistic. To be specific, the receiving device may determine the second test threshold $\theta_{i,Bob}$ of the i'th block based on the second testing hypothesis. Based on the second test threshold $\theta_{i,Bob}$ of the i'th block, the second testing statistic, and the second testing hypothesis, the second false alarm probability $P_{FA,i,Bob}$ of the i'th block may be computed, which may be expressed as $$P_{FA,i,Bob} = Pr\{\delta_{i,Bob} > \theta_{i,Bob} | H_{20}\} = \quad (17)$$

$$Q\left(\frac{\theta_{i,Bob}}{\sqrt{\text{var}\{\delta_{i,Bob} | H_{20}\}}}\right) = Q\left(\sqrt{\frac{2\theta_{i,Bob}^2 \rho_t^2 \gamma_{i,Bob}}{L}}\right)$$

where $\gamma_{i, Bob}$ represents the i'th block SNR of the receiving device, $\delta_{i, Bob}$ represents the second testing statistic of the i'th block. The second false alarm probability may thereby be computed.

According to some embodiments, the second false alarm probability may be computed as the mean of all data blocks, which may be calculated by $$P_{FA,Bob} = \quad (18)$$

$$E\left\{Q\left(\sqrt{\frac{(\theta_{Bob}^0)^2 2\rho_t^2 \gamma_{i,Bob}}{L}}\right)\right\} = \frac{1}{2}\left(1 - \sqrt{\frac{(\theta_{Bob}^0)^2 \rho_t^2 \gamma_{Bob}}{L + (\theta_{Bob}^0)^2 \rho_t^2 \gamma_{Bob}}}\right)$$

where $\gamma_{Bob}=E(\gamma_{i,Bob})$ represents the SNR of the receiving device.

In step S300, based on the Neyman-Pearson theorem, the receiving device determines the second optimal threshold when the second false probability is less than or equal to the upper bound of the second false probability, and then the second detection probability may be determined. Finally, the authentication accuracy may be determined from the second detection probability.

According to some embodiments, based on the Neyman-Pearson theorem, the second false probability $\varepsilon_{PFA,\ Bob}$ is satisfied when $P_{FA,\ Bob} \leq \varepsilon_{PFA,\ Bob}$, where $\varepsilon_{PFA,\ Bob}$ denotes the upper bound of the second false probability. Thus, the second false probability can be ensured to be less than or equal to the upper bound of the second false probability, with a maximum equal to $\varepsilon_{PFA,\ Bob}$ the second detection probability.

According to some embodiments, when $P_{FA,\ Bob} \leq \varepsilon_{PFA,\ Bob}$ the second false probability may be set equal to the upper bound of the second false probability $\varepsilon_{PFA,\ Bob}$, after which the second optimal threshold $\theta_{Bob}{}^0$ may be computed as $$\theta_{Bob}^0 = \sqrt{\frac{(1-2\varepsilon_{PFA,Bob})^2 L}{4(\varepsilon_{PFA,Bob} - \varepsilon_{PFA,Bob}^2)\rho_t^2 \gamma_{Bob}}},$$

where L denotes signal length of each block of the second signal, $\gamma_{Bob}$ denotes the SNR at the receiving device, and $\rho_t^2$ denotes the energy allocation of tag signal. The second optimal threshold may thereby be computed.

According to some embodiments, the receiving device determines the second detection probability from the second optimal threshold. To be specific, the receiving device may compute the second detection probability based on the second testing statistic and the second optimal threshold, where the second detection probability of the i'th block may be expressed as $$P_{D,i,Bob} = Pr\{\delta_{i,Bob} > \theta_{i,Bob} \mid H_{21}\} = Q\left(\frac{\theta_{i,Bob} - L}{\sqrt{\mathrm{var}\{\delta_{i,Bob} \mid H_{21}\}}}\right) = \qquad (19)$$

$$\begin{cases} Q\left(\sqrt{\frac{2(\theta_{i,Bob} - L)^2 \rho_t^2 \gamma_{i,Bob}}{L}}\right) & \theta_{i,Bob} \geq L \\ 1 - Q\left(\sqrt{\frac{2(\theta_{i,Bob} - L)^2 \rho_t^2 \gamma_{i,Bob}}{L}}\right) & \theta_{i,Bob} < L \end{cases}$$

from which the second detection probability may be computed.

According to some embodiments, the second detection probability may be computed by taking the average of all data blocks, which may be expressed by $$P_{D,Bob} = E\{Pr\{\delta_{i,Bob} > \theta_{i,Bob} \mid H_{21}\}\} = \qquad (20)$$

$$\begin{cases} \frac{1}{2}\left(1 - \sqrt{\frac{(\theta_{Bob}^0 - L)^2 \rho_t^2 \gamma_{Bob}}{L + (\theta_{Bob}^0 - L)^2 \rho_t^2 \gamma_{Bob}}}\right), & \theta_{Bob}^0 \geq L \\ \frac{1}{2}\left(1 + \sqrt{\frac{(\theta_{Bob}^0 - L)^2 \rho_t^2 \gamma_{Bob}}{L + (\theta_{Bob}^0 - L)^2 \rho_t^2 \gamma_{Bob}}}\right), & \theta_{Bob}^0 < L \end{cases}$$

In summary:

$$P_{D,Bob} = \frac{1}{2}\left(1 - \mathrm{sign}(\theta_{Bob}^0 - L)\sqrt{\frac{(\theta_{Bob}^0 - L)^2 \rho_t^2 \gamma_{Bob}}{L + (\theta_{Bob}^0 - L)^2 \rho_t^2 \gamma_{Bob}}}\right) \qquad (21)$$

According to some embodiments, from the second detection probability, the receiving device may determine the authentication accuracy $\eta_{Bob}$, which may be expressed as $\eta_{Bob} = P_{D,\ Bob}$.

According to some embodiments, as shown in FIG. 2, the security detection method for the physical layer authentication system could obtain the probability of security authentication (PSA) based on the FAIL value $\eta_{Eve}$ and the authentication accuracy $\eta_{Bob}$, by step S400. To be specific, in step S400, the receiving device may compute the PSA from the FAIL value $\eta_{Eve}$ and the authentication accuracy $\eta_{Bob}$, which may be used to estimate the security of physical layer authentication system.

In step S400, the probability of security authentication (PSA) may be expressed as $$P_{SA} = \max\{\eta_{Bob} - \eta_{Eve}, 0\} = \qquad (22)$$

$$\max\left\{\frac{1}{2}\left(1 - \mathrm{sign}(\theta_{Bob}^0 - L)\sqrt{\frac{(\theta_{Bob}^0 - L)^2 \rho_t^2 \gamma_{Bob}}{L + (\theta_{Bob}^0 - L)^2 \rho_t^2 \gamma_{Bob}}}\right. \right. -$$

$$I_{Eve}\left(1 - \mathrm{sign}(\theta_{Eve}^0 - (1-\rho_s)L)\right.$$

$$\left.\left.\sqrt{\frac{(\theta_{Eve}^0 - (1-\rho_s)L)^2 \gamma_{Eve}}{L + (\theta_{Eve}^0 - (1-\rho_s)L)^2 \gamma_{Eve}}}\right)\right), 0\right\}$$

where $\eta_{Eve}$ denotes the FAIL value and $\eta_{Eve} = P_{D,\ Eve}I_{Eve}$; $P_{D,\ Eve}$ denotes the first detection probability; $I_{Eve}$ denotes the authentication information leakage ratio; $\eta_{Bob}$ denotes the authentication accuracy; $\eta_{Bob} = P_{D,\ Bob}$; and $P_{D,\ Bob}$ denotes the second detection probability. The PSA may thereby be computed. According to some embodiments, when $\eta_{Bob} - \eta_{Eve}$ is positive, PSA is a nonzero value.

According to some embodiments, based on the Neyman-Pearson theorem, the probability of security authentication (PSA) should satisfied if the first false alarm probability is less than or equal to the upper bound of the first false alarm probability and the second false alarm probability is less than or equal to the upper bound of the second false alarm probability. Mathematically, the optimization problem may be expressed as $$P_{SA} = \max\{\eta_{Bob} - \eta_{Eve}, 0\}$$

$$P_{FA,Bob} \leq \varepsilon_{PFA,Bob}.$$

subject to $$P_{FA,Eve} \leq \varepsilon_{PFA,Eve}$$

Based on this formulation, covertness, security, and robustness of the physical layer authentication system can be analyzed simultaneously.

Figure 3:
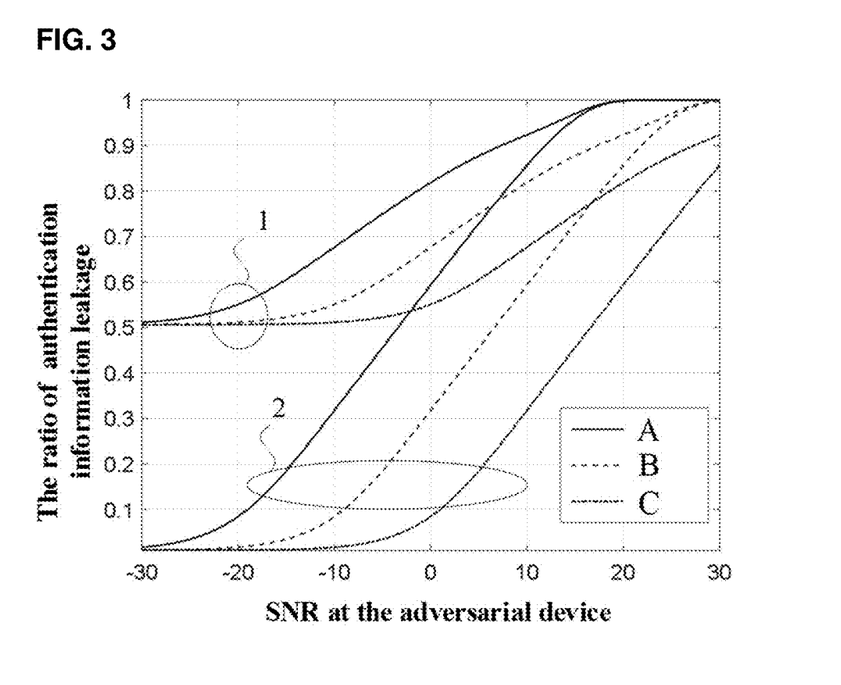
FIG. 3 is a schematic waveform diagram of a ratio of authentication information leakage and a signal-to-noise ratio (SNR) at an active, adversarial monitoring device for the physical layer authentication system according to some embodiments.

FIG. 3 is a schematic waveform diagram of the ratio of authentication information leakage and the SNR at the adversary of the security detection method for the physical layer authentication system that considers adversary computing capability according to some embodiments.

For some embodiments, the curve shown in FIG. 3 consists of two groups. The horizontal axis represents the SNR at the adversary and the vertical axis represents the ratio of authentication information leakage. The first group was obtained with a key length of 32 bits. The second group was obtained with a key length of 64 bits. In addition, the tag signal length 1 for both the two groups is 64 bits. Each group has three curves: A, B, C. The curves A, B and C are obtained under a condition that $\rho_s^2$ equal to 0.7, 0.9, 0.99 respectively. According to formulas (5) and (6), it is possible to calculate a conditional key distribution. When a distance between the transmitting device and the adversary is very far, the SNR of adversary is very low. FIG. 3 shows that the adversary might have a bigger noisy observation due to a low SNR, a higher key equivocation would result, and the value of $I_{Eve}$ would be reduced. Second, when the lengths of tag signals are equal, decreasing the key length relative to the tag length could decrease the equivocation and increase the value of $I_{Eve}$.

Figure 4:
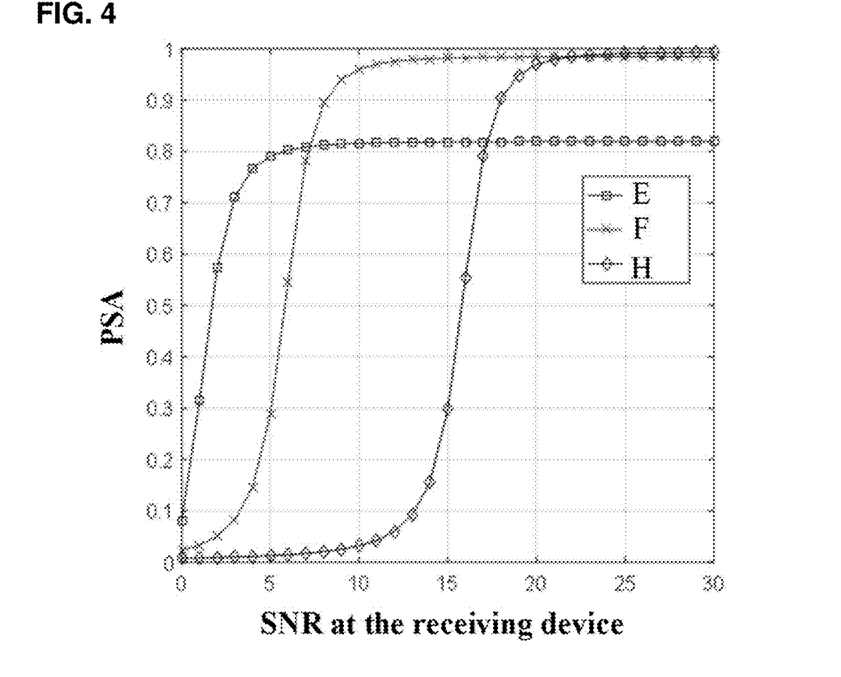
FIG. 4 is a schematic waveform diagram showing a security authentication probability (PSA) of a physical layer authentication system and a signal-to-noise ratio (SNR) at a receiving device of the physical layer authentication system according to some embodiments.

FIG. 4 shows a schematic waveform diagram of a security authentication probability (PSA) and a SNR at the receiving device according to some embodiments.

According to some embodiments, as shown in FIG. 4, curves E, F, H are obtained under the conditions that $\rho_s^2$ equal to 0.7, 0.9, 0.99, respectively. The horizontal axis represents the SNR at the receiving device and the vertical axis represents the security authentication probability (PSA). FIG. 4 shows that $\rho_s^2=0.9$ is the best option among the three cases, whereas the PSA performance deteriorates when $\rho_s^2$ either increases or decreases. Thus, a tradeoff for setting $\rho_s^2$ is possible.

In this disclosure, the receiving device's SNR and the adversary's SNR may be determined by distances between locations of them and the transmitting device respectively. If the transmitting device is aware of the adversary coming closer, the transmitting device assesses the security level through the proposed security model. If the transmitting device finds the security level below some threshold, a wise option for the transmitting device is to adjust its authentication parameters, or even to cancel this authentication request to await an appropriate chance.

In this disclosure, the transmitting device transmits the first signal, and the second signal may be obtained by means of the first signal passing through the wireless fading channel. The adversary could receive the second signal, obtain the first false alarm probability and the authentication information leakage ratio based on the second signal and the first testing statistic. Based on the Neyman-Pearson theorem, the adversary could determine the first optimal threshold while making the first false alarm probability less than or equal to the upper bound of the first false alarm probability. Then, the first detection probability may be determined. Finally, based on the authentication information leakage ratio and the first detection probability, the FAIL value can be determined. The receiving device could receive the second signal, obtain the object signal based on the second signal, determine the residual signal from the object signal, and compute the second testing statistic from the residual signal. Based on the Neyman-Pearson theorem, the receiving device may determine the second optimal threshold while making the second false alarm probability less than or equal to the upper bound of the second false alarm probability. Finally, the second detection probability may be computed, after which the authentication accuracy may be determined. Based on the FAIL value and the authentication accuracy, the PSA may be determined, from which to detect the security of the physical layer authentication system to measure its safety. This may improve the convenience and accuracy of performance analysis.

A computer-readable storage medium is used in some embodiments. One of ordinary skill in the art will appreciate that all or part of the various steps of the above-described embodiments may be accomplished by a program instructing the associated hardware. The program may be stored in a computer-readable memory, and the memory may include: a flash disk, a read-only memory (ROM), a random access memory (RAM), disk or CD, etc.

The security detection method for the physical layer authentication system that considers adversary computing capability described for the various embodiments is described in detail above. The principles and embodiments of the disclosure have been described herein with reference to specific examples, and the description of the above embodiments is only to assist in understanding the method of the disclosure and its core idea. At the same time, for the general technician in this field, there will be some changes in the specific implementation and application scope according to the idea of this disclosure. In summary, the contents of this specification should not be understood as a limitation to the disclosure.

What is claimed is:

1. A method for security detection for a physical layer authentication system including a transmitting device, a receiving device, an active adversarial system and an unaware monitoring device, comprising:
   a) said transmitting device transmitting a first signal, said first signal passing through a wireless fading channel and thereby becoming a second signal;
   b) said active adversarial system
      i) receiving the second signal;
      ii) computing a first testing statistic and an estimated tag from the second signal;
      iii) determining a key equivocation value from the estimated tag;
      iv) obtaining an authentication information leakage ratio value from the key equivocation value;
      v) determining a first false alarm probability estimate from first testing statistic and a first testing hypothesis;
      vi) determining a first optimal threshold while making the first false alarm probability less than or equal to an upper bound of the first false alarm probability according to a Neyman-Pearson theorem;
      vii) determining a first detection probability, and estimating a feasible authentication information leakage (FAIL) value as a function of an authentication information leakage ratio and the first detection probability;
   c) said receiving device
      i) receiving the second signal;
      ii) determining an object signal from the second signal;
      iii) determining a residual signal from the object signal;
      iv) computing a second testing statistic as a function of the residual signal;
      v) determining a second optimal threshold while making the second false alarm probability less than or equal to an upper bound of the second false alarm probability based on the Neyman-Pearson theorem;
      vi) computing a second detection probability;
      vii) determining an authentication accuracy from the second detection probability; and
   d) said transmitting device further determining a probability of security authentication for measuring safety of the physical layer authentication system based on the FAIL value and the authentication accuracy.

2. The method for security detection of claim 1, further comprising computing the probability of security authentication (PSA) as:

$$P_{SA} = \max\{\eta_{Bob} - \eta_{Eve}, 0\}$$

wherein $\eta_{Eve}$ denotes the FAIL and $\eta_{Eve}=P_{D,\,Eve}I_{Eve}$; $P_{D,\,Eve}$ denotes the first detection probability; $I_{Eve}$ denotes the authentication information leakage ratio; $\eta_{Bob}$ denotes the authentication accuracy such that $\eta_{Bob}=P_{D,\,Bob}$; and $P_{D,\,Bob}$ denotes the second detection probability.

3. The method for security detection of claim 1, wherein the first signal is transmitted as data blocks.

4. The method for security detection of claim 1, further comprising computing the key equivocation value $H(k|\gamma_i)$ as $$H(k \mid y_i) \cong H(k \mid s_i, \hat{t}_i) = -\sum_{k_i \in K} f(k_i \mid \hat{t}) \log_2 f(k_i \mid \hat{t}) = -\sum_{t_i \in K} f(t_i \mid \hat{t}) \log_2 f(t_i \mid \hat{t})$$

wherein k denotes a key; $k_i$ denotes an i'th block of key; $\gamma_i$ denotes the second signal; $\hat{t}_i$ denotes an i'th block of the estimated tag; $t_i$ denotes the i'th block of a tag; and $s_i$ denotes an i'th block of a message signal.

5. The method for security detection of claim 4, further comprising computing the authentication information leakage ratio $I_{Eve}$ is computed as $$I_{Eve} = \left(1 - \frac{H(k \mid y_i)}{\log_2 |T|}\right)$$

wherein T denotes an i'th block of tag $t_i$.

6. The method for security detection of claim 1, wherein the first testing hypothesis is expressed as $H_{10}$: the second carrier signal is a normal signal $H_{11}$: the second carrier signal is a tagged signal and a second testing hypothesis is expressed as $H_{20}$: the tag signal is not present in the residual signal $H_{21}$: the tag signal is present in the residual signal.

7. The method for security detection of claim 6, further comprising:
determining an i'th block of a first optimal threshold $\theta_{i,\,Eve}$ from the first testing hypothesis; and
determining an i'th block of a second optimal threshold $\theta_{i,\,Bob}$ from the second testing hypothesis.

8. The method of security detection of claim 7, further comprising:
computing the i'th block of the first false alarm probability $P_{FA,i,Eve}$ according to $P_{FA,i,Eve}=Pr\{\delta_{i,Eve}>\theta_{i,Eve}|H_{10}\}$ based on the i'th block of first optimal threshold $\theta_{i,Eve}$ and the i'th block of the first testing hypothesis $\delta_{i,Eve}$; and
computing the i'th block of second false alarm probability $P_{FA,i,Bob}$ as $P_{FA,i,Bob}=Pr\{\delta_{i,Bob}>\theta_{i,Bob}|H_{20}\}$ based on the i'th block of second optimal threshold $\theta_{i,Bob}$ and the i'th block of second testing hypothesis $\delta_{i,Bob}$.

9. The method for security detection of claim 8, wherein the first optimal threshold $\theta_{Eve}^0$ is determined by setting the first false alarm probability $P_{FA,Eve}$ equal to an upper bound of the first false alarm probability $\varepsilon_{PFA,\,Eve}$ and $\theta_{Eve}^0$ is expressed as $$\theta_{Eve}^0 = \sqrt{\frac{(1 - 2\varepsilon_{PFA,Eve})^2 L}{4(\varepsilon_{PFA,Eve} - \varepsilon_{PFA,Eve}^2)\gamma_{Eve}}};$$

the second optimal threshold $\theta_{Bob}^0$ is determined by setting the second false alarm probability $P_{FA,\,Bob}$ equal to an upper bound of the second false alarm probability $\varepsilon_{PFA,\,Bob}$, and $\theta_{Bob}^0$ is expressed as $$\theta_{Bob}^0 = \sqrt{\frac{(1 - 2\varepsilon_{PFA,Bob})^2 L}{4(\varepsilon_{PFA,Bob} - \varepsilon_{PFA,Bob}^2)\rho_t^2 \gamma_{Bob}}};$$

wherein L denotes a signal length of each block of the second signal, $\gamma_{Bob}$ denotes a signal-to-noise-ratio (SNR) at the receiving device, $\rho_t^2$ denotes an energy allocation of the tag signal, $\varepsilon_{PFA,\,Eve}$ denotes the upper bound of the first false probability, and $\varepsilon_{PFA,\,Bob}$ denotes the upper bound of the second false probability.

10. The method of security detection of claim 9, wherein the i'th block of the first detection probability $P_{D,i,Eve}$ is determined from the first testing statistic and the first optimal threshold, and $P_{D,i,Eve}$ is expressed as $$P_{D,i,Eve} = Pr\{\delta_{i,Eve} > \theta_{Eve}^0 \mid H_{11}\} = Q\left(\frac{\theta_{Eve}^0 - (1-\rho_s)L}{\sqrt{\text{var}\{\delta_{i,Eve} \mid H_{11}\}}}\right) = \quad (VI)$$

$$\begin{cases} Q\left(\sqrt{\frac{2(\theta_{Eve}^2 - (1-\rho_s)L)^2 \gamma_{i,Eve}}{L}}\right), & \theta_{Eve}^0 \geq (1-\rho_s)L \\ 1 - Q\left(\sqrt{\frac{2(\theta_{Eve}^2 - (1-\rho_s)L)^2 \gamma_{i,Eve}}{L}}\right), & \theta_{Eve}^0 < (1-\rho_s)L \end{cases};$$

$$P_{D,i,Eve} = Pr\{\delta_{i,Eve} > \theta_{Eve}^0 \mid H_{11}\} = Q\left(\frac{\theta_{Eve}^0 - (1-\rho_s)L}{\sqrt{\text{var}\{\delta_{i,Eve} \mid H_{11}\}}}\right) =$$

$$\begin{cases} Q\left(\sqrt{\frac{2(\theta_{Eve}^2 - (1-\rho_s)L)^2 \gamma_{i,Eve}}{L}}\right), & \theta_{Eve}^0 \geq (1-\rho_s)L \\ 1 - Q\left(\sqrt{\frac{2(\theta_{Eve}^2 - (1-\rho_s)L)^2 \gamma_{i,Eve}}{L}}\right), & \theta_{Eve}^0 < (1-\rho_s)L \end{cases}$$

the i'th block of the second detection probability $P_{D,i,Bob}$ is obtained based on the second testing statistic and the first optimal threshold, and the $P_{D,i,Bob}$ is expressed as $$P_{D,i,Bob} = Pr\{\delta_{i,Bob} > \theta_{i,Bob} \mid H_{21}\} = Q\left(\frac{\theta_{i,Bob} - L}{\sqrt{\text{var}\{\delta_{i,Bob} \mid H_{21}\}}}\right) = \quad (VII)$$

$$\begin{cases} Q\left(\sqrt{\frac{2(\theta_{i,Bob} - L)^2 \rho_t^2 \gamma_{i,Bob}}{L}}\right) & \theta_{i,Bob} \geq L \\ 1 - Q\left(\sqrt{\frac{2(\theta_{i,Bob} - L)^2 \rho_t^2 \gamma_{i,Bob}}{L}}\right) & \theta_{i,Bob} < L \end{cases};$$

$$P_{D,i,Bob} = Pr\{\delta_{i,Bob} > \theta_{i,Bob} \mid H_{21}\} = Q\left(\frac{\theta_{i,Bob} - L}{\sqrt{\text{var}\{\delta_{i,Bob} \mid H_{21}\}}}\right) =$$

$$\begin{cases} Q\left(\sqrt{\frac{2(\theta_{i,Bob}-L)^2 \rho_t^2 \gamma_{i,Bob}}{L}}\right) & \theta_{i,Bob} \geq L \\ 1-Q\left(\sqrt{\frac{2(\theta_{i,Bob}-L)^2 \rho_t^2 \gamma_{i,Bob}}{L}}\right) & \theta_{i,Bob} < L \end{cases} \quad 5$$

wherein, $\rho_s^2+\rho_t^2=1$, $\gamma_{i,Eve}$ represents the i'th block SNR of the active adversarial system, and $\gamma_{i,Bob}$ represents the i'th block SNR of the receiving device.

\* \* \* \* \*